United States Patent
Tatu

(10) Patent No.: US 8,239,872 B2
(45) Date of Patent: Aug. 7, 2012

(54) METHOD AND SYSTEM FOR CONTROLLING DISTRIBUTION OF WORK ITEMS TO THREADS IN A SERVER

(75) Inventor: Serban Tatu, Bothell, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 908 days.

(21) Appl. No.: 12/314,481

(22) Filed: Dec. 11, 2008

(65) Prior Publication Data

US 2010/0153962 A1   Jun. 17, 2010

(51) Int. Cl.
*G06F 9/00* (2006.01)
(52) U.S. Cl. ......................................... 718/102; 718/101
(58) Field of Classification Search .......................... None
See application file for complete search history.

(56) References Cited

U.S. PATENT DOCUMENTS

| | | | |
|---|---|---|---|
| 5,752,031 A | 5/1998 | Cutler et al. | |
| 5,991,792 A * | 11/1999 | Nageswaran | 718/102 |
| 6,477,561 B1 | 11/2002 | Robsman | |
| 6,898,617 B2 * | 5/2005 | Doolittle et al. | 709/201 |
| 8,073,900 B2 * | 12/2011 | Guedalia et al. | 709/203 |
| 2004/0199926 A1 * | 10/2004 | Gilgen et al. | 719/318 |
| 2006/0143608 A1 * | 6/2006 | Dostert et al. | 718/1 |

OTHER PUBLICATIONS

Revanuru, Naresh, "Workload management in WebLogic Server 9.0", Mar. 7, 2006, Oracle Technology Network.

* cited by examiner

*Primary Examiner* — Eric Coleman

(57) ABSTRACT

A system and method are presented to control distribution of work items to threads in a server. The system and method include a permit dispenser that keeps track of permits, and a plurality of thread pools each including a queue with a configurable size, being configured with a desired concurrency and a size of the queue that is equal to a total number of work items to be executed by pool threads in the thread pool. The number of permits specifies a total number of threads available for executing the work items in the server. Each pool thread executes a work item in the thread pool, determines whether a thread surplus or a thread deficit exists, and shrinks or grows the thread pool respectively.

14 Claims, 3 Drawing Sheets

METHOD AND SYSTEM FOR CONTROLLING DISTRIBUTION OF WORK ITEMS TO THREADS IN A SERVER

BACKGROUND

Software applications often require concurrent execution of work items in multiple operating system threads. For the purpose of this application, work items are a decomposition of application functions into individual units of work. An example of a work item is counting the words in a file. Work items can be composed together to form a workflow. Workflows can then be re-used as work items inside other workflows. An example of such a reuse is counting all the words in all of the files in a directory.

There are physical limitations governing the maximum number of operating system threads that can be used by a process running a software application. These physical limitations are well documented for each operating system type and are outside the scope of this application. Software applications typically manage such limitations by organizing threads into pools served by queues. Threads in a pool typically "take" work items from the queue and execute them.

When work items are decomposed into other work items that also require concurrent execution, using one single thread pool for all the concurrency needs makes it hard to ensure that certain workflows do not exceed a predefined level of concurrency. In addition, there is a potential for deadlock and non-uniform patterns of execution. For example, if the execution of a work item needs to wait for the completion of other work items, deadlock can occur in the situation where all the threads in a thread pool end up waiting for other work items.

BRIEF DESCRIPTION OF THE DRAWINGS

Exemplary embodiments of a method and system for controlling distribution of work items to threads in a server will be described in detail with reference to the following figures, in which like numerals refer to like elements, and wherein.

DETAILED DESCRIPTION

Figure 1:
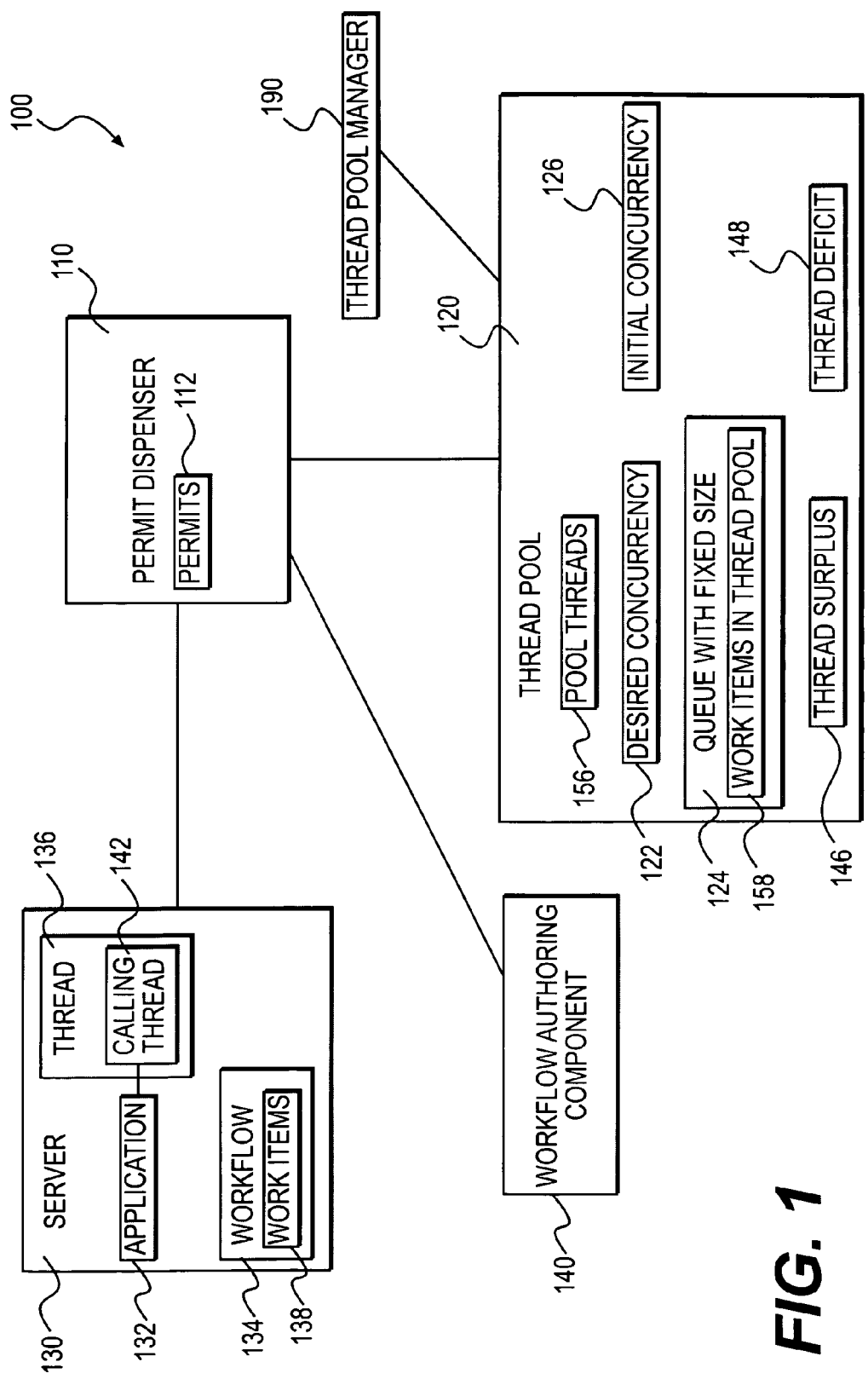
FIG. 1 illustrates an exemplary system for controlling the distribution of work items to threads in a server.

The Hewlett Packard (HP) Operation Orchestration workflow execution server is a particular case of an application server. The server executes workflows that implement information technology (IT) business processes. A workflow may be written to execute some of the work items in multiple threads. A list of inputs is provided to a process, i.e., operation, being executed, along with a parameter specifying the desired concurrency level.

For example, the execution of a workflow may deploy a software patch to 100 machines. A workflow authoring component configures the step that deploys the patch with a list of 100 machine addresses and a concurrency factor of 20. If only one such workflow is to be executed, the server will create a thread pool with 20 threads, which execute work items taken from a queue with 100 slots. However, if the service needs to execute 100 such workflows concurrently, the total number of threads allocated solely to the execution of this particular type of workflow is 2000, excluding any other threads employed by the server. If the server runs in a Windows 32 bit operating system, its process simply cannot create this many threads, because the memory data structures necessary to support such a large number of threads will exceed the addressing space.

While technically possible, a solution that involves a single thread pool for processing all of the work items across all the workflows is not simple, due to the following constraints:

1) The single thread pool solution cannot allocate a subset of the threads in the pool to one particular workflow. Considering the example above, if a single pool of 300 threads is used throughout the whole system and only 20 threads must be used to patch 100 servers, it is difficult to ensure that any point in time no more than 20 threads in the pool execute on behalf of one single workflow.

2) If the execution of a work item needs to wait for the completion of other work items, deadlock can occur in the situation where all the threads in the single thread pool end up waiting for other work items.

3) Using one single queue served by one single thread pool may lead to scenarios that all the work items of a particular workflow end up queued behind those of another workflow. While the overall throughput of the system stays the same, the latency for workflows may experience large variations.

There will be described an embodiment of a system for controlling distribution of work items to threads includes a server and a permit dispenser that keeps track of permits. A number of permits constrains the total number of threads available for executing the work items in the server. The system further makes use of a plurality of custom thread pools, each of which corresponds to a set of the work items and uses configurable size queues. Each thread pool is configured with a desired concurrency and a queue size that is equal to the total number of work items in the set. A thread pool is created when at least one permit is available. Each pool thread executes work items in the thread pool. After executing a work item, a thread determines whether a thread surplus or a thread deficit exists, and shrinks or grows the thread pool respectively.

The thread surplus exists when the number of threads in the thread pool is more than the number of remaining unexecuted work items in the queue. If the thread surplus exists, the pool thread returns the permit to the permit dispenser and terminates, thus shrinking the thread pool. The thread deficit exists when the number of pool threads working on the work items in the thread pool is less than both the desired concurrency and the number of remaining unexecuted work items in the queue. If the thread deficit is greater than zero, the pool thread requests a number of permits from the permit dispenser that is equal to the calculated thread deficit.

The system may include a workflow authoring component that is used to specify the desired concurrency for a set of work items. The desired concurrency is normally set to be equal to the maximum number of work items from the set that can be executed in parallel. In order to execute this number of work items in parallel, the system requests a number of permits equal to the desired concurrency. The permit dispenser maintains the number of available permits and assigns available permits on a first come first served basis. If no permits are available, a calling thread, which is the thread in the system that attempts the parallel execution, executes one work item and then re-requests from the permit dispenser the number of permits that is equal to the lesser of the desired concurrency and the number of remaining unexecuted work items.

A thread pool manager ensures that each pool thread in a thread pool executes work items without relying on another pool thread in the same thread pool to complete a sub-item. For example, if the work item being executed has sub-items, the sub-items are executed by threads in a different thread pool. This prevents the occurrence of deadlock.

An embodiment of a method controls distribution of work items to threads in a server. The method is executed by a computer including a processor. The method includes providing a permit dispenser that keeps track of a plurality of permits. A number of the plurality of permits specifies a total number of threads available for executing the work items in the server. The method further includes creating a plurality of thread pools each corresponding to a set of the work items and using a configurable size queue. Each thread pool is configured with a desired concurrency and a queue size that is equal to the total number of work items in the set. The method further includes each pool thread executing a work item in the thread pool, determining whether a thread surplus or a thread deficit exists, and shrinking or growing the thread pool respectively.

An embodiment of a computer readable medium provides instructions for controlling distribution of work items to threads in a server. The instructions include providing a permit dispenser that keeps track of a plurality of permits. A number of the plurality of permits specify a total number of threads available for executing work items in a server. The instructions further include creating a plurality of thread pools each corresponding to a set of the work items and using a configurable size queue. Each thread pool is configured with a desired concurrency and a queue size that is equal to a total number of work items in the set. The instructions further include each pool thread executing a work item in the thread pool, determining whether a thread surplus or a thread deficit exists, and shrinking or growing the thread pool respectively.

FIG. 1 illustrates an exemplary system 100 for controlling the distribution of work items 138 to threads 136 in a server 130. The system 100 uses specialized thread pools for each concurrent workflow. The system 100 ensures that the total number of threads employed for work item execution at any point in time does not exceed a threshold. The threshold is defined by a configurable number of thread permits. The pools automatically adjust themselves by adding or removing threads, such that no thread permits remain unused. Keeping the total number of threads under a predefined limit ensures that the process does not exceed the maximum number of threads allowed by the operating system. Deadlock, which occurs in a situation where all the threads in a single thread pool end up waiting for the completion of other work items, is avoided because no thread waits for the execution of a work item to be executed by another thread of the same thread pool. The solution also exhibits a more uniform distribution of latencies for work item executions than it would be possible with a single thread pool.

The system 100 includes a permit dispenser 100, which is a data structure that keeps track of a set of permits 112, i.e., thread permits. The number of permits 112 specifies the total number of threads 136 allowed for execution of workflows 134 in the server 130. The workflows 134 include a plurality of work items 138. The server 130 also includes applications 132 that determine the total number of available threads 136, i.e., available workflow threads, based on the system configuration and memory limit. The threads 136 include a calling thread 142 that creates a thread pool 120 based upon the available permits 112 and that attempts parallel thread execution. The total number of workflows 134 executing in the server 130 is referred to as a workload (not shown).

The system 100 further includes a thread pool manager 190 for managing one or more thread pools 120 each including a queue 124 with a fixed, configurable size. Each thread pool 120 is configured with a desired concurrency 122 for a set of work items 138 and the size of the queue 124. The desired concurrency 122 is equal to the maximum number of work items 158 from the set that can be executed in parallel. The desired concurrency 122 is typically determined by a user using a workflow authoring component 140. The size of the queue 124 is equal to the total number of work items 158 to be executed. Permits 112 are obtained by the calling threads 142 prior to creating the thread pools 120, and are returned to the server 130 by pool threads 156 once the work items 158 in the thread pool 120 are completed. A calling thread 142 can also be a pool thread 156. The workflow authoring component 140 groups work items 158 so that each work item 158 belongs to a single workflow 134 at a time and a set of work items 158 from the same workflow 134 can be executed concurrently.

The permit dispenser 110 and the thread pool 120 function as follows. When the system 100 needs to execute the work items 158 in parallel, the calling thread 142 requests a number of permits 112 equal to the desired concurrency 122. The permit dispenser 110 maintains the number of available permits 112 and assigns the available permits 112 to the calling threads 142 on a first come first served basis.

If no permits 112 are available, the calling thread 142 executes a work item. Once the work item 158 is finished, the calling thread 142 goes back to the permit dispenser 110 to re-request the number of permits equal to the lesser of the desired concurrency 122 and the number of remaining unexecuted work items 138. This process repeats until some permits 112 are obtained or all the work items 138 are executed in the calling thread 142.

If a number of available permits 112 greater than zero is obtained by the system 100, the calling thread 142 requests the creation of a thread pool 120 with the following parameters: an initial concurrency 126 that is equal to the number of permits obtained; the desired concurrency 122 specified in the workflow authoring component 140, which can be the same as the initial concurrency 126; and the queue 124 with a size equal to the total number of work items 158 in the thread pool 120 to be executed.

The thread pool 120 then creates a number of pool threads 156 that is equal to the initial concurrency 126 and creates the queue 124 with the size that is equal to the total number of work items 158 in the thread pool 120 to be executed.

Each pool thread 156 in the thread pool 120 performs the following steps in a cycle: a) removing a work item 158 from the queue 124, b) executing the work item 158, c) evaluating or determining whether a thread surplus 146 or a thread deficit 148 exists, and d) if a thread surplus 146 or a thread deficit 148 exists, shrinking or growing the thread pool 120 respectively.

A thread surplus 146 exists when there are more pool threads 156 in the thread pool 120 than there are remaining unexecuted work items 158 in the queue 124. If the thread surplus 146 exists, the pool thread 156 returns the permit 112 to the permit dispenser 110 and terminates, thus shrinking the thread pool 120. If there is no thread surplus 146 or thread deficit 148, the pool thread 156 takes another work item 158 from the queue 124 and executes the work item 158.

A thread deficit 148 exists when the current size of the thread pool 120 is less than both the desired concurrency 122 and the number of remaining unexecuted work items 158 in the queue 124. The current size of the thread pool 120 is the current number of pool threads 156 working on the work items 158. The pool thread 156 may use the following exemplary formula to determine the thread deficit 148.

Thread Deficit 148=Min(Desired Concurrency,Work Items Remaining in Queue)−Current Pool Size If the thread deficit 148 is greater than zero, the pool thread 156 may request a number of permits 112 from the permit dispenser 110 that is equal to the calculated thread deficit 148 and add the newly acquired pool threads 156 to the thread pool 120.

The thread pool manager 190 ensures that each of the pool threads 156 in a particular thread pool 120 executes work items 138 without relying on another pool thread 156 in the same thread pool 120 to complete a sub-item. For example, if a work item 138 requires execution of other work items 138, such as a sub-item, the dependent sub-item will be executed by threads in a different thread pool. Therefore, deadlock, which occurs in a situation where all the threads in a single thread pool end up waiting for the completion of other work items, is avoided because no thread in any thread pool 120 will need to wait for work items 138 to be completed by the pool threads 156 in the same thread pool 120.

By design, all of the pool threads 156 in any one thread pool 120 only execute work items 138 that belong to the same workflow 134. In other words, no work item 138 needs to be queued behind another work item 138 belonging to another workflow 134, which may take a significant amount of time to complete. Since the scheduling of threads is ensured by the underlying operating system, the overall latency of one workflow is governed by the operating system and not by a specific application.

A calling thread 142 that cannot secure any thread permits 112 in order to create a thread pool 120 may start executing the work items 158 itself instead of waiting. Permits 112 may be returned back to the server 130 as soon as the thread pool 120 detects that the thread pool 120 can satisfy the remaining work with the available pool threads 156. New permits 112 may be requested as soon as any pool thread 156 in the thread pool 120 finishes one of the work items 158 and detects a thread deficit 148.

Figure 2:
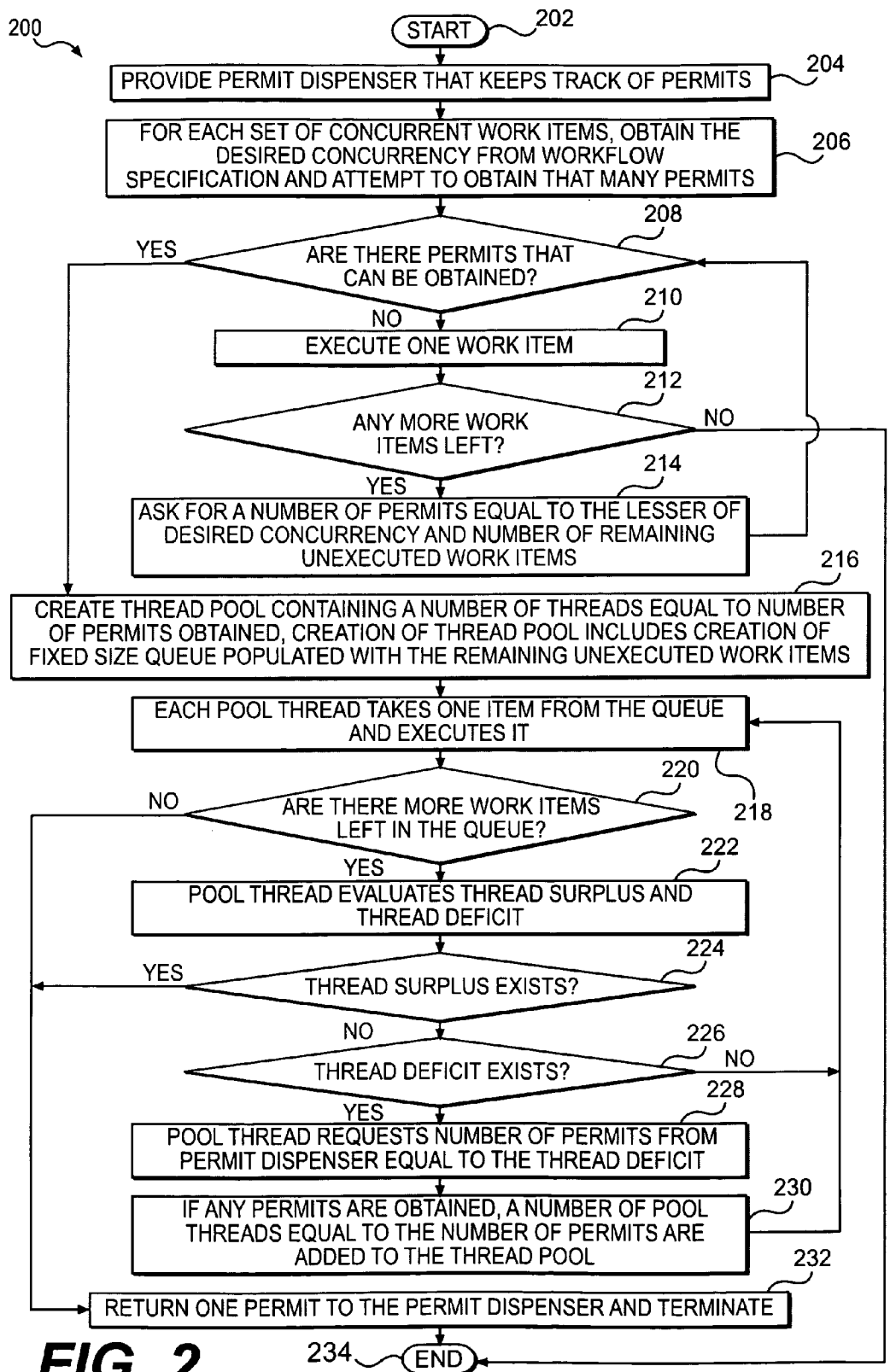
FIG. 2 is a flow chart illustrating an exemplary method for controlling distribution of the work items to the threads in the server.

FIG. 2 is a flow chart illustrating an exemplary method 200 for controlling distribution of the work items 138 to the threads 136 in the server 130. The exemplary method 200 starts 202 by providing the permit dispenser 110 that keeps track of the permits 112 (block 204). For each set of concurrent work items 138, the method 200 obtains the desired concurrency 122 from a workflow specification specified by the workflow authoring component 140 and attempts to obtain the number of permits 112 that is equal to the desired concurrency 122 (block 206). The number of the permits 112 constrains the total number of threads 136 available for executing the work items 138 in the server 130. The permit dispenser 110 maintains the number of available permits 112 and assigns the available permits 112 on a first come first served basis.

If no permits 112 are available (block 208), the calling thread 142 executes one work item 158 (block 210). If there are more work items left (block 212), the calling thread 142 re-requests from the permit dispenser 110 a number of permits 112 equal to the lesser of the desired concurrency 122 and the number of remaining unexecuted work items 138 (block 214). The method 200 goes back to block 208 to determine if there are permits 112 that can be obtained 208.

If there are permits that can be obtained, the method 200 creates the thread pool 120 containing a number of threads 156 equal to the number of permits 112 obtained (block 216). The creation of the thread pool 120 includes creation of the configurable size queue 124 populated with the remaining unexecuted work items (block 216). Each pool thread 156 takes one work item 138 from the queue 124 and executes the work item 138 (block 218).

If there are no more work items 138 left in the queue 124 (block 220), the pool thread 156 returns one permit 112 to the permit dispenser 110 and terminates (block 232). If there are remaining unexecuted work items 138 in the queue 124 (block 220), the pool thread 156 determines whether a thread surplus 146 or a thread deficit 148 exists and shrinks or grows the thread pool 120 respectively (block 222). The thread surplus 146 exists when the number of pool threads 156 in the thread pool 120 is more than the number of remaining unexecuted work items 158 in the queue. The thread deficit 148 exists when the number of pool threads 156 working on the work items 158 in the thread pool 120 is less than both the desired concurrency 122 and the number of remaining unexecuted work items 158 in the queue.

If the thread surplus 146 exists, the pool thread 156 returns the permit 112 to the permit dispenser 110 and terminates (block 232). If no thread surplus 146 or thread deficit 148 exists (blocks 224, 226), the pool thread 156 proceeds to execute another work item 158 in the thread pool 120 (block 218).

If the thread deficit 148 is greater than zero, the pool thread 156 requests a number of permits 112 from the permit dispenser 110 that is equal to the thread deficit 148 (block 228). If any permits 112 are obtained, a number of pool threads equal to the number of permits 112 are added to the thread pool 120 (block 230), and the pool thread 156 proceeds to execute another work item 158 in the thread pool 120 (block 218).

If there are no more work items left (block 212), the method 220 ends at block 234.

Figure 3:
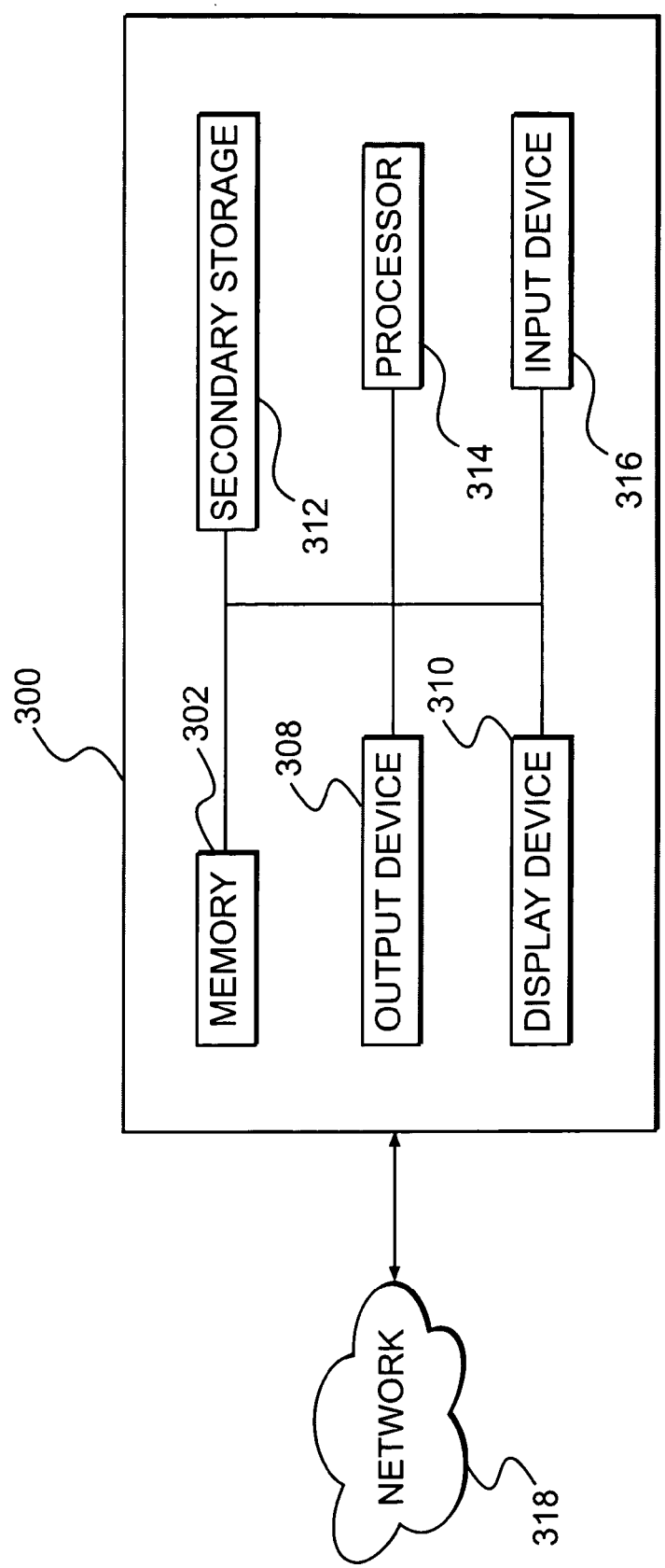
FIG. 3 illustrates exemplary hardware components of a computer that may be used in connection with the exemplary method for controlling distribution of the work items to the threads in the server.

FIG. 3 illustrates exemplary hardware components of a computer 300 that may be used in connection with the exemplary method 200 for controlling distribution of the work items 138 to the threads 136 in the server 130. The computer 300 includes a connection with a network 318 such as the Internet or other type of computer or telephone network. The computer 300 typically includes a memory 302, a secondary storage device 312, a processor 314, an input device 316, a display device 310, and an output device 308.

The memory 302 may include random access memory (RAM) or similar types of memory. The secondary storage device 312 may include a hard disk drive, floppy disk drive, CD-ROM drive, or other types of non-volatile data storage, and may correspond with various databases or other resources. The processor 314 may execute information stored in the memory 302, the secondary storage 312, or received from the Internet or other network 318. The input device 316 may include any device for entering data into the computer 300, such as a keyboard, keypad, cursor-control device, touch-screen (possibly with a stylus), or microphone. The display device 310 may include any type of device for presenting a visual image, such as, for example, a computer monitor, flat-screen display, or display panel. The output device 308 may include any type of device for presenting data in hard copy format, such as a printer, or other types of output devices including speakers or any device for providing data in audio form. The computer 300 can possibly include multiple input devices, output devices, and display devices.

Although the computer 300 is shown with various components, one skilled in the art will appreciate that the computer 300 can contain additional or different components. In addition, although aspects of an implementation consistent with the method for controlling distribution of work items to threads in a server are described as being stored in memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer 300 to perform a particular method.

While the method and system for controlling distribution of the work items 138 to the threads 136 in the server 130 have been described in connection with an exemplary embodiment, those skilled in the art will understand that many modifications in light of these teachings are possible, and this application is intended to cover variations thereof.

What is claimed is:

1. A computer-implemented system for controlling distribution of work items to
   threads in a server, comprising: hardware computer processor to execute:
   a permit dispenser that keeps track of permits, a number of permits specifying a total number of threads available for executing the work items in the server;
   a workflow authoring component that determines a desired concurrency, wherein the desired concurrency is equal to a maximum number of work items that can be executed in parallel;
   a thread pool manager to manage one or more thread pools and to request a number of permits equal to the desired concurrency; and wherein if no permits are available, a calling thread to: determine if work permits are available; if no work permits are available, execute one work item and re-request from the permit dispenser the number of permits that is equal to a lesser of the desired concurrency and a number of remaining unexecuted work items.

2. The system of claim 1, wherein if the system obtains one or more permits, the thread pool manager is arranged to create thread pool that comprises:
   the one or more pool threads, wherein a number of the one or more pool threads is equal to an initial concurrency that is equal to a number of permits obtained from the permit dispenser and a queue size that is equal to a total number of work items in a set of work items the thread pool is to execute.

3. The system of claim 1, wherein a thread surplus exists when a number of pool
   threads in the thread pool is more than a number of remaining unexecuted work items.

4. The system of claim 3, wherein if the thread surplus exists, the pool thread is arranged to return the permit to the permit dispenser and terminate, thereby shrinking the thread pool.

5. The system of claim 1, wherein a thread deficit exists when a number of pool
   threads working on the work items in the thread pool is less than both the desired
   concurrency and a number of remaining unexecuted work items.

6. The system of claim 5, wherein if the thread deficit is greater than zero, the pool thread is arranged to request a number of permits from the permit dispenser that is equal to the thread deficit.

7. The system of claim 6, wherein the pool thread is arranged to add acquired new pool threads to the thread pool.

8. The system of claim 1, wherein the thread pool manager ensures that each pool thread in the thread pool executes work items without relying on another pool thread in a same thread pool to complete a sub-item, and wherein the sub-item is executed by threads in a different thread pool, thereby preventing a deadlock.

9. A method for controlling distribution of work items to threads in a server, the method being implemented by a computer including a processor and a memory, comprising:
   using the processor to provide a permit dispenser that keeps track of a plurality of permits, a number of the plurality of permits specifying a total number of threads available for executing the work items in the server;
   determining a desired concurrency, using the processor, the desired concurrency being equal to a maximum number of work items enabled to execute in parallel; and
   creating a plurality of thread pools stored in the memory using the processor; the thread pool manager requesting a number of permits equal to the desired concurrency; and
   if no permits are available, executing, using the processor, one work item and re-requesting from the permit dispenser the number of permits equal to a lesser of the desired concurrency and the number of remaining unexecuted work items.

10. The method of claim 9, wherein a thread surplus exists when a number of pool threads in the thread pool is more than a number of remaining unexecuted work items.

11. The method of claim 10, further comprising if the thread surplus exists, the pool thread returning the permit to the permit dispenser and terminating, thereby shrinking the thread pool.

12. The method of claim 9, wherein a thread deficit exists when a number of pool threads working on the work items in the thread pool is less than both the desired concurrency and a number of remaining unexecuted work items.

13. The method of claim 12, further comprising:
    if the thread deficit is greater than zero, the pool thread requesting a number of permits from the permit dispenser that is equal to the thread deficit; and
    adding newly acquired pool threads to the thread pool.

14. A non-transitory computer readable medium providing instructions for controlling distribution of work items to threads in a server, the instructions, if executed, causes a processor to:
    provide a permit dispenser to keep track of a plurality of permits, a number of the plurality of permits specifying a total number of threads available for executing work items in a server;
    provide a workflow authoring component to determine a desired concurrency, the desired concurrency being equal to a maximum number of work items that can be executed in parallel; and
    use a thread pool manager to create a plurality of thread pools stored in a memory and to request a number of permits equal to the desired concurrency; and
    if no permits are available, execute one work item and re-request from the permit dispenser the number of permits equal to a lesser of the desired concurrency and the number of remaining unexecuted work items.

* * * * *

UNITED STATES PATENT AND TRADEMARK OFFICE
CERTIFICATE OF CORRECTION

PATENT NO.         : 8,239,872 B2                                    Page 1 of 1
APPLICATION NO.    : 12/314481
DATED              : August 7, 2012
INVENTOR(S)        : Serban Tatu It is certified that error appears in the above-identified patent and that said Letters Patent is hereby corrected as shown below:

In column 8, line 17, in Claim 9, after "pools" delete "stored".

Signed and Sealed this
Second Day of April, 2013

Teresa Stanek Rea
*Acting Director of the United States Patent and Trademark Office*